(12) United States Patent
Vijithakumara

(10) Patent No.: US 11,702,082 B2
(45) Date of Patent: Jul. 18, 2023

(54) VIRTUAL SIM FOR VEHICLE

(71) Applicant: Toyota Motor North America, Inc., Plano, TX (US)

(72) Inventor: Evan A. Vijithakumara, Frisco, TX (US)

(73) Assignee: Toyota Motor North America, Inc., Plano, TX (US)

( * ) Notice: Subject to any disclaimer, the term of this patent is extended or adjusted under 35 U.S.C. 154(b) by 330 days.

(21) Appl. No.: 16/952,660

(22) Filed: Nov. 19, 2020

(65) Prior Publication Data

US 2022/0153277 A1    May 19, 2022

(51) Int. Cl.
| | |
|---|---|
| *G08B 23/00* | (2006.01) |
| *B60W 40/08* | (2012.01) |
| *H04W 8/18* | (2009.01) |
| *G06V 20/59* | (2022.01) |

(52) U.S. Cl.
CPC .......... *B60W 40/08* (2013.01); *G06V 20/59* (2022.01); *H04W 8/183* (2013.01); *B60W 2540/043* (2020.02); *B60W 2540/21* (2020.02)

(58) Field of Classification Search
CPC ........... B60W 40/08; B60W 2540/043; B60W 2540/21; G06V 20/59; H04W 8/183; H04W 4/40; G06Q 30/0645

USPC .............. 340/573.1, 438, 439, 426.1, 426.16
See application file for complete search history.

(56) References Cited

U.S. PATENT DOCUMENTS

| | | | |
|---|---|---|---|
| 7,545,262 B2 | 6/2009 | Batchik | |
| 9,317,977 B2 | 4/2016 | Amirpour et al. | |
| 9,853,670 B2 | 12/2017 | Li | |
| 10,701,551 B1* | 6/2020 | Obaidi | H04W 76/10 |
| 10,841,765 B2* | 11/2020 | Nelson | H04M 1/72412 |
| 2007/0142024 A1 | 6/2007 | Clayton et al. | |
| 2011/0270935 A1 | 11/2011 | Tozaki et al. | |
| 2014/0074957 A1 | 3/2014 | Liu et al. | |
| 2015/0046022 A1* | 2/2015 | Bai | G07C 5/008 701/461 |
| 2016/0126995 A1* | 5/2016 | Li | H04W 4/44 455/558 |
| 2020/0238952 A1* | 7/2020 | Lindsay | B60R 25/40 |
| 2021/0120595 A1* | 4/2021 | Singh | H04W 24/10 |

* cited by examiner

*Primary Examiner* — Anh V La
(74) *Attorney, Agent, or Firm* — Dinsmore & Shohl LLP

(57) ABSTRACT

A method includes identifying a user; obtaining a user profile matched with the identification of the user, wherein the user profile includes SIM data associated with a carrier plan; assigning the SIM data associated with the carrier plan of the obtained user profile to a data communication module to virtually replicate the SIM data of the user; and reverting carrier settings of the data communication module to original settings based on the user no longer being identifiable.

17 Claims, 4 Drawing Sheets

VIRTUAL SIM FOR VEHICLE

TECHNICAL FIELD

The present specification generally relates to methods and systems for mobile twinning and, more specifically, to methods and systems for mobile twinning a vehicle with carrier settings of a user based on a profile of the user.

BACKGROUND

Currently, users of shared vehicles (e.g., customers of a ride-sharing or car-sharing service) must pair a device (e.g., a mobile device, smart phone, smart pad, etc.) with a vehicle using a Bluetooth connection in a multistep process to make and receive phone calls using a Bluetooth hands-free protocol ("HFP"). While connected over Bluetooth HFP, the data associated with calls that are taken in the vehicle (e.g., using a hands-free system of the vehicle) must be routed to and from the device through the Bluetooth pairing. This individual pairing is separately required in every vehicle in which a user wants to send or receive cellular data using the vehicle. However, individually pairing a user's cell phone with each vehicle the user may access may be cumbersome and unnecessarily subject user's data to overexposure. Accordingly, new architectures for accessing and using a customer's cellular data while in a shared vehicle may be required.

SUMMARY

In one embodiment, a method includes identifying a user; obtaining a user profile matched with the identification of the user, wherein the user profile includes SIM data associated with a carrier plan; assigning the SIM data associated with the carrier plan of the obtained user profile to a data communication module to virtually replicate the SIM data of the user; and reverting carrier settings of the data communication module to original settings based on the user no longer being identifiable.

In another embodiment, a vehicle includes a data communication module and a controller, the controller configured to: identify a user of the vehicle; obtain a user profile matched with the identification of the user, wherein the user profile includes SIM data associated with a carrier plan; assign the SIM data associated with the carrier plan of the obtained user profile to the data communication module of the vehicle to virtually replicate the SIM data of the user; and revert carrier settings of the data communication module to original settings based on the user no longer being identifiable by the vehicle.

In yet another embodiment, a vehicle includes a data communication module and a controller, the controller configured to: assign SIM data associated with an original equipment manufacturer carrier plan to the data communication module; identify a user of the vehicle; obtain a user profile matched with the identification of the user, wherein the user profile includes SIM data associated with a carrier plan; assign the SIM data associated with the carrier plan of the obtained user profile to the data communication module of the vehicle to virtually replicate the SIM data of the user; and revert carrier settings of the data communication module based on the user no longer being identifiable by the vehicle.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
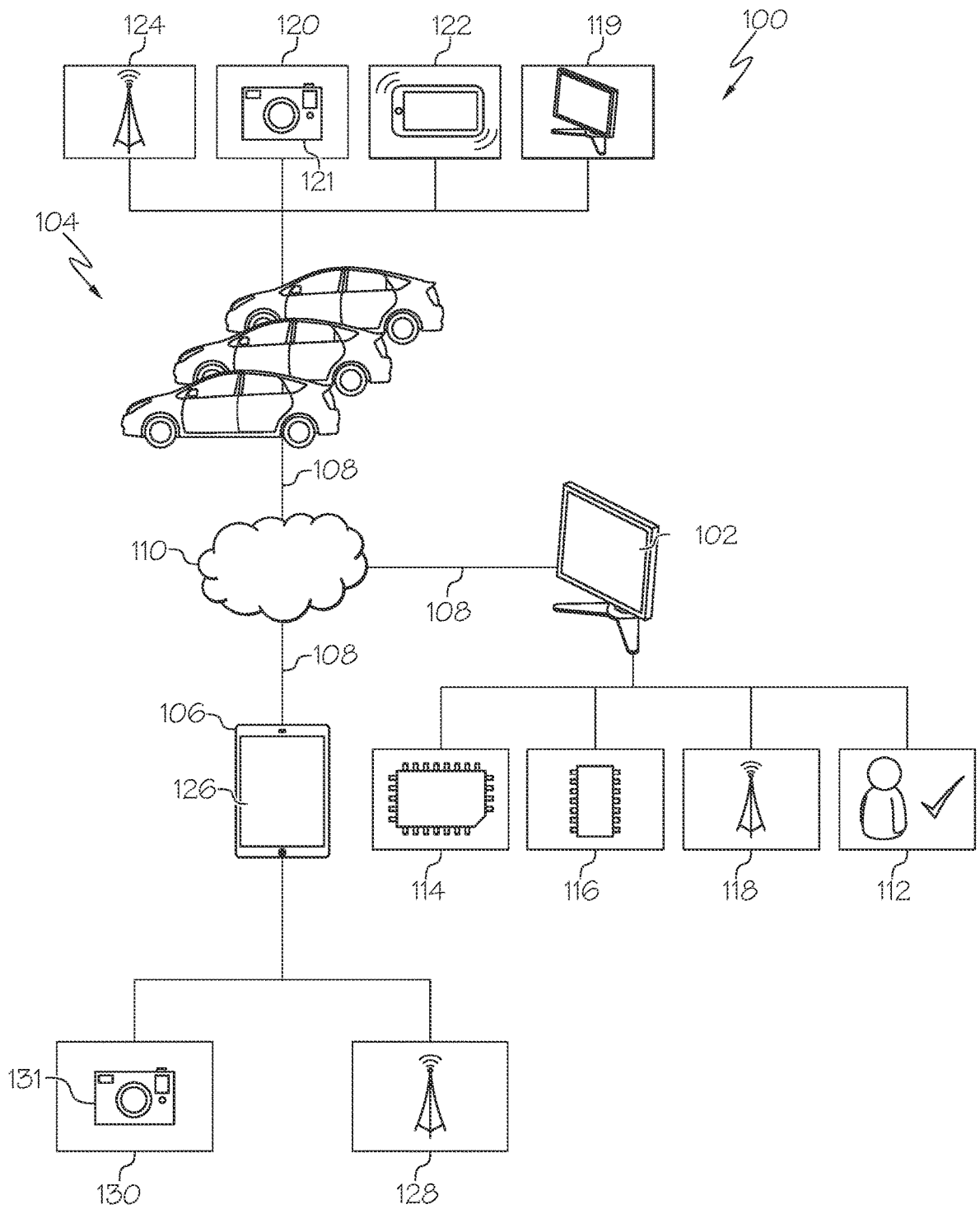
FIG. 1 schematically depicts a system for virtually replicating a SIM of a user, according to one or more embodiments shown and described herein.

Currently, users (e.g., customers of a ride-sharing or car-sharing service) must pair a device (e.g., a mobile device, smart phone, smart pad, etc.) with a vehicle using a Bluetooth connection in a multistep process to make and receive phone calls using a Bluetooth hands-free protocol ("HFP"). While connected over Bluetooth HFP, the data associated with calls that are taken in the vehicle (e.g., using a hands-free system of the vehicle) must be routed to and from the device through the Bluetooth pairing. This individual pairing is separately required in every vehicle in which a user wants to send or receive cellular data using the vehicle. Not all users are willing to pair their phone in a vehicle that is not their own because of, for example, concerns about leaving paired phone information (e.g., contact lists, call history, text message logs, etc.) behind when using a vehicle that is not their own. Additionally, vehicle ownership models may continue to shift from a model based primarily upon individual ownership of one vehicle to sharing arrangements in which a user may have access to or operational capability of multiple vehicles. Assuming customer's general desire for privacy and convenience to remain unchanged, new architectures for accessing and using a customer's cellular data while in a shared vehicle may be required Vehicles in the current generation are equipped with data communication modules (DCM) and sophisticated antenna arrays that can support inbound and outbound calls. DCMs also support data connections for vehicle services. In current vehicles, use of this equipment may depend upon a unique data plan for a vehicle itself. For example, an original equipment manufacturer (OEM) may have a preferred carrier and may place subscriber identification module (SIM) cards capable of sending and receiving data on the network of this preferred carrier in the vehicle to connect the vehicle to the carrier's network. These SIM cards may send and receive data associated with the use of the vehicle that is useful to the OEM (e.g., diagnostic data from a vehicle's CAN bus). Additionally, some vehicles may be equipped with a second slot for a SIM of a user of the vehicle. The user may insert a SIM card associated with his or her carrier account or another account and may use the vehicle to send and receive data through the additional SIM card. In some cases, the plan associated with this SIM card may be separate from a user's cellular data plan or may even require a separate carrier.

As users seek greater flexibility in the utilization of vehicles, car-sharing services are increasingly popular. Car-sharing services may provide a pool of accessible vehicles to a user, which he or she may access and utilize on an as-needed basis, eliminating the need for a potentially under-utilized individual vehicle. Users may find inserting and removing their own individual SIM card impractical when using one or more vehicles of a car-sharing or vehicle rental service because doing so may require a user to carry and insert a SIM card associated with his or her account every time he or she rents or otherwise operates a new vehicle. Additionally, while users currently have the option to pair their phone with shared vehicles, doing so may be cumbersome and may result in unnecessarily trailing their own data behind. That is, contact lists, call logs, and other data from a user's phone may remain in one or more onboard or otherwise connected storage locations. Accordingly, systems and methods for detecting a user and assigning the user's phone number and data plan details to a vehicle DCM such that the user can make inbound and outbound calls and utilize data services with the vehicle DCM then reverting the DCM to a default state based on the user ending use of the vehicle are required.

Referring now to FIG. 1, a system 100 for accessing and transferring data using a user's mobile data plan through onboard systems is shown. The system 100 includes a server 102 and a plurality of vehicles 104. In some embodiments, the system 100 includes a device 106. The server 102, the plurality of vehicles 104, and the device 106 may be communicatively coupled by a communication path 108. The communication path 108 may communicatively couple the server 102, the plurality of vehicles 104, and the device 106 to, for example, a network such as the cloud network 110.

The server 102 may include one or more processors 114, one or more memory modules 116, network interface hardware 118, and a user profile identification module 112. Each of the plurality of vehicles 104 may include a user identification module 120, an interactive display 122, and network interface hardware 124. The user identification module 120 may be communicatively coupled to an imaging device 121 or other device for identifying a user. In some embodiments, the network interface hardware 124 may be a data communication module. The device 106 may include an interactive display 126 and network interface hardware 128. In some embodiments, the device 106 may include a user identification module 130, which may be communicatively coupled to an imaging device 121 or other device for identifying a user. Each of the user profile identification module 112, the user identification module 120, and the user identification module 130 may be a program module in the form of operating systems, application program modules, and other program modules stored in the server 102, the device 106, or the plurality of vehicles 104. Such a program module may include, but is not limited to, routines, subroutines, programs, objects, components, data structures and the like for performing specific tasks or executing specific data types as will be described below.

The server 102 may include, for example, the one or more processors 114 and the one or more memory modules 116 storing one or more machine-readable instructions. The one or more processors 114 may include any device capable of executing machine-readable instructions. Accordingly, the one or more processors 114 may be a controller, an integrated circuit, a microchip, a computer, or any other computing device. The one or more processors and the one or more memory modules 116 may be communicatively coupled to the other components of the system 100 by the communication path 108. The server 102 may be a remoter server, a local server, an edge device, and the like.

The user profile identification module 112 may look up a user profile associated with a particular user or the device 106 of the user. For example, the user profile identification module 112 may receive an input from the user identification module 120 of each of the plurality of vehicles 104 or from the device 106 that includes identifying information (e.g., photographic or biometrics or biometric data or other identifying data) and may associate the identifying information with the user profile. If a user profile has been established for the detected user, then that user profile may be stored in a data storage component of the vehicle or the server 102 and the user profile identification module 112 may access that user profile. Alternatively, if no user profile exists, the user profile identification module 112 may create a user profile for the detected user. The user profile identification module 112 may also maintain a profile log comprising user profiles previously loaded by each of the plurality of vehicles 104. This log may include a timestamp when each user profile was loaded. Every time that a user profile is loaded, the log may be updated.

In some embodiments, when the user profile identification module 112 determines that no user profile exists for the user, a guest profile may be created for the user. A guest profile may comprise default settings for one or more components of the vehicle that may be loaded when an individual driving the vehicle has not established a user profile. A guest profile may be stored in one or more data storage components of the server 102. In some examples, a user may adjust the default vehicle settings associated with the guest profile. In some embodiments, a guest profile may be required to conduct at least a minimum required instruction set for a particular vehicle, which may be based on the particular aspects of the vehicle.

In some embodiments, the user profile identification module 112 may include information related to a carrier account of a user (i.e., subscriber information) and may link the network interface hardware 124 with the information related to the user's carrier account to simulate the use of a SIM card associated with the user's carrier account as will be explained in greater detail herein. For example, the user profile identification module 112 may identify a user and may cause the network interface hardware 124 of each of the plurality of vehicles 104 to simulate a SIM card of the user.

In some embodiments, the user may use an app on a smart device (e.g., the device 106) to link his or her cellular data/phone plan to his or her profile. An in-app interface may provide the user the option to, for example, add an existing cellular plan to the user's profile such that the vehicle 104 can make and receive calls from the hardware installed in the vehicle as described in greater detail herein. In some embodiments, the vehicle 104 may be a vehicle in a fleet of vehicles such that any of the vehicles in the fleet are compatible with the user's cellular plan once the cellular plan is associated with the user's device (e.g., the device 106).

The network interface hardware 118 may communicatively couple the server 102 to the communication path 108. The network interface hardware 118 may be any device capable of transmitting and/or receiving data with external vehicles or servers directly or via a network, such as the network 110. Accordingly, network interface hardware 118 can include a communication transceiver for sending and/or receiving any wired or wireless communication. For example, the network interface hardware 118 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, network interface hardware 118 may include hardware configured to operate in accordance with the Bluetooth wireless communication protocol and may include a Bluetooth send/receive module for sending and receiving Bluetooth communications.

Each of the plurality of vehicles 104 may be a vehicle in a pool of vehicles generally offered for use, for example, to a customer ("user") of a car rental service (e.g., a car-sharing service). The plurality of vehicles 104 can include vehicles of any classification, make, model, size, or type. Users of the car-sharing service or car rental service may access one or more of the plurality of vehicles 104 and in some embodiments each of the plurality of vehicles 104 may be configured with the necessary systems, equipment, software, and/or modules necessary to identify a user and to virtually load the SIM data of that user to the DCM of the vehicle as will be explained in greater detail herein.

Each of the plurality of vehicles 104 may include a controller 119 of the vehicle 104. The controller 119 may include, for example, one or more processors and one or more memory modules storing one or more machine-readable instructions. The one or more processors may include any device capable of executing machine-readable instructions. Accordingly, the one or more processors may be a controller, an integrated circuit, a microchip, a computer, or any other computing device. The controller 119 may be communicatively coupled to the other components of the system 100 by the communication path 108.

The user identification module 120 may include one or more devices for identifying a user. The devices may include one or more of, for example, imaging devices (e.g., onboard camera or onboard cameras) for capturing an image, retinal scanners, fingerprint or other biometric identifiers, voice recognition modules, etc. The user identification module 120 may identify a user, for example, using a login or username and a password combination. In some embodiments, the user identification module 120 may utilize a two-factor authentication method. In some embodiments, the user identification module may identify a user based on a proximity of a particular device, such as the device 106 of the user or another device such as, for example, a key fob with a distinct digital signature. In some embodiments, the user identification module 120 includes the imaging device 121 (e.g., one or more onboard cameras). The imaging device 121 may capture one or more images of the user and compare them with images in a database to identify the user. The imaging device 121 may be, for example, a camera or other imaging device (thermal, etc.) in the cabin of the vehicle or otherwise communicatively coupled to one or more of the vehicle and the server 102. The database of images may be located, for example, in the server 102 or may be otherwise accessible via the network 110.

The interactive display 122 may comprise any known or yet-to-be-developed display, such as LCD, LED, plasma, OLED, CRT, projection, holographic, electronic paper, or any other type of suitable output display. In some embodiments, the interactive display 122 is positioned in a center console or other location of each of the plurality of vehicles 104. In some embodiments, the interactive display 122 may be a head-up display (HUD). In some embodiments, the interactive display 122 may be a tactile display and in such embodiments, the interactive display 122 may be any device capable of providing tactile output in the form of refreshable tactile messages. In some embodiments, one or more of the plurality of vehicles 104 does not include a display.

The network interface hardware 124 may communicatively couple each of the plurality of vehicles 104 to the communication path 108. The network interface hardware 124 may be any device capable of transmitting and/or receiving data with external vehicles or servers directly or via a network, such as the network 110. Accordingly, network interface hardware 124 can include a communication transceiver for sending and/or receiving any wired or wireless communication. For example, the network interface hardware 124 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, network interface hardware 124 may include hardware configured to operate in accordance with the Bluetooth wireless communication protocol and may include a Bluetooth send/receive module for sending and receiving Bluetooth communications.

The network interface hardware 124 may be a data communication module (e.g., in a vehicle). The data communication module may be any device capable of transmitting and/or receiving data via a wireless network. Accordingly, the data communication module may include a communication transceiver for sending and/or receiving data according to any wireless communication standard. For example, the data communication module may include a chipset (e.g., antenna, processors, machine readable instructions, etc.) to communicate over wireless computer networks using various communication protocols such as, for example, TCP, UDP, NTTP, wireless fidelity (Wi-Fi), WiMax, Bluetooth, IrDA, Wireless USB, Z-Wave, ZigBee, or the like. In some embodiments, the data communication module includes a Bluetooth transceiver that enables the exchange of information with the network 110 via Bluetooth communication. In some embodiments, the data communication module is configured to identify a suitable communication protocol for one or more signals that may be transmitted and/or received by each of the plurality of vehicles 104. In some embodiments, the data communication module may be capable of emulating a SIM. For example, the data communication module may receive account details of a carrier plan associated with a user and may emulate the account such that the data communication module can place and receive calls and use mobile data associated with the user's carrier account as described in greater detail herein.

The device 106 may be, for example, a portable input/output device (e.g., a smartphone, smart pad, or other device) including the interactive display 126 (e.g., a touchscreen or tactile display). The interactive display 126 may comprise any known or yet-to-be-developed display, such as LCD, LED, plasma, OLED, CRT, projection, holographic, electronic paper, or any other type of suitable output display. If provided as a tactile display, the interactive display 126 may be any device capable of providing tactile output in the form of refreshable tactile messages. In some embodiments, the device 106 does not include a display, for example, in embodiments in which the device 106 is a display-less key fob that is capable of transmitting and receiving a signal.

The network interface hardware 128 may communicatively couple the device 106 to the communication path 108.

The network interface hardware 128 may be any device capable of transmitting and/or receiving data with external vehicles or servers directly or via a network, such as the network 110. Accordingly, network interface hardware 128 can include a communication transceiver for sending and/or receiving any wired or wireless communication. For example, the network interface hardware 128 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, network interface hardware 128 may include hardware configured to operate in accordance with the Bluetooth wireless communication protocol and may include a Bluetooth send/receive module for sending and receiving Bluetooth communications.

The user identification module 130 may include one or more devices for identifying a user (e.g., one or more user identification devices). The devices may include one or more of, for example, imaging devices (e.g., device camera or device cameras), retinal scanners, fingerprint or other biometric identifiers, voice recognition modules, etc. The user identification module 130 may identify a user, for example, using a login or username and a password combination. In some embodiments, the user identification module 130 may utilize a two-factor authentication method. In some embodiments, the user identification module 130 includes the imaging device 131 (e.g., one or more device cameras). The imaging device 131 may capture one or more images of the user and compare them with images in a database to identify the user. The imaging device 131 may be, for example, a camera that is communicatively coupled to one or more of the device 106 and the server 102. The database of images may be located, for example, in the server 102 or may be otherwise accessible via the network 110. In some embodiments, the device 106 may verify a user's identity and may send a signal (e.g., a digital signature) associated with one or more of the device 106 and/or the user that may include data associated with the SIM card of the user such that the data communication module can emulate the SIM card of the user.

The communication path 108 may be formed from any medium that is capable of transmitting a signal such as, for example, conductive wires, conductive traces, optical waveguides, or the like. In some embodiments, the communication path 108 may facilitate the transmission of wireless signals, such as WiFi, Bluetooth®, Near Field Communication (NFC) and the like. Moreover, the communication path 108 may be formed from a combination of mediums capable of transmitting signals. In one embodiment, the communication path 108 comprises a combination of conductive traces, conductive wires, connectors, and buses that cooperate to permit the transmission of electrical data signals to components such as processors, memories, sensors, input devices, output devices, and communication devices. Accordingly, the communication path 108 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The network 110 may include, for example, one or more computer networks (e.g., a personal area network, a local area network, grid computing network, wide area network, etc.), cellular networks, satellite networks and/or a global positioning system and combinations thereof. Accordingly, the server 102, the device 106, and the plurality of vehicles 104 can be communicatively coupled to the network 110 and/or one another via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Figure 2:
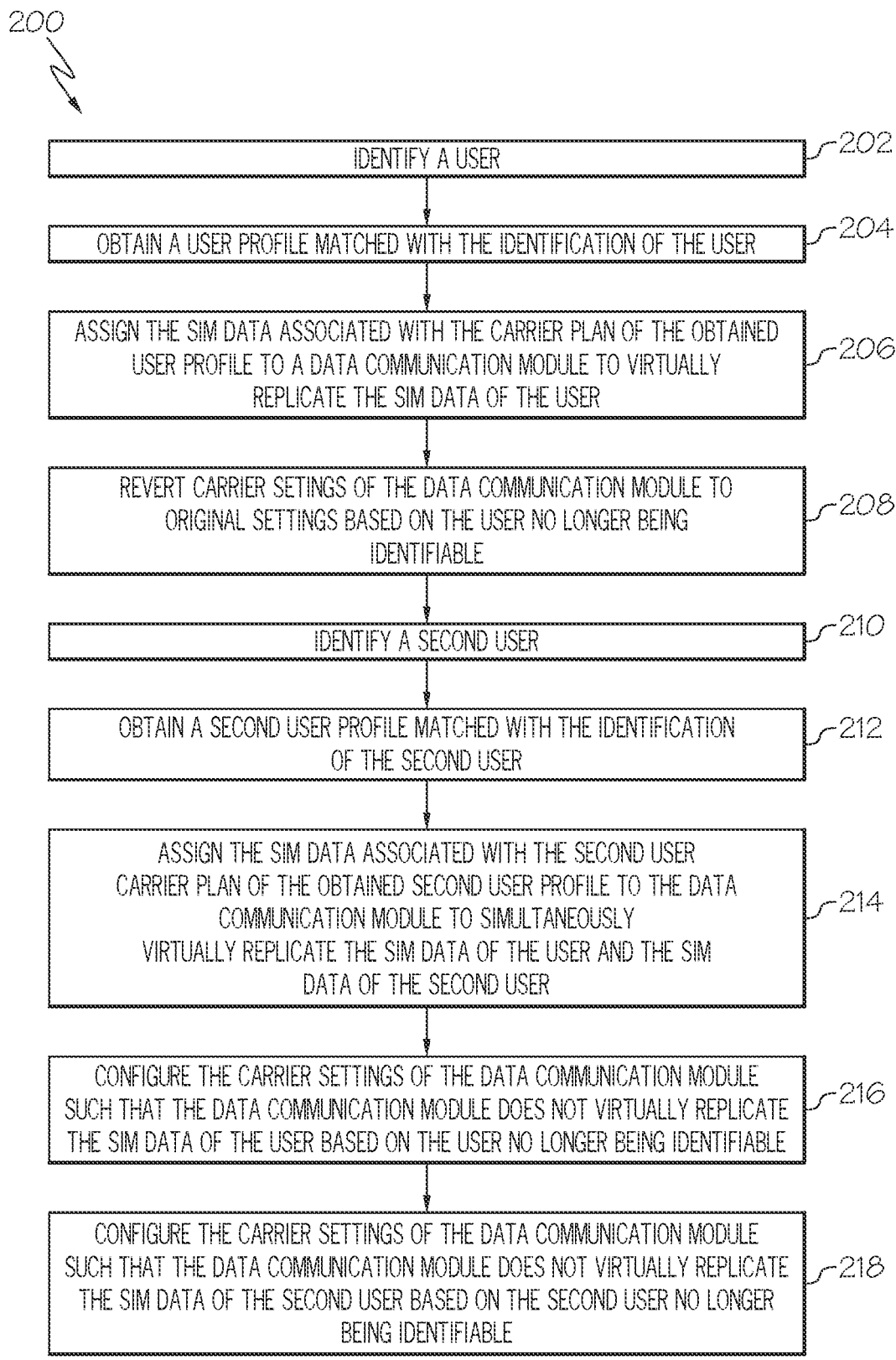
FIG. 2 depicts a method for virtually replicating a SIM of a user, according to one or more embodiments shown and described herein.

Referring now to FIGS. 1 and 2, a method 200 of assigning carrier settings of a data communication module of one or more of the plurality of vehicles 104 based on the identity of a user of the one or more vehicles is shown.

At step 202, a user is identified. The user may be identified using, for example, the user identification module 120 of the vehicle or the user identification module 130 of the device 106. The user may be a user of a vehicle. In some embodiments, the user may be identified using one or more biometric identifiers. For example, a user may be identified using fingerprint or voice recognition. The device 106 and/or the vehicle may be configured with a fingerprint reader and/or the vehicle may use an onboard sound system including speakers and one or more microphones to record and identify a user's voice. The recorded biometric data may be compared to biometric data in a database. In some embodiments, the system 100 may capture one or more images of the user and may send the image data to the server 102 to compare the captured image data with image data in a database. In other embodiments, the user may be identified based on the identification of the device 106. For example, the server 102 may receive location data from the device 106 and may use such data to determine that the user is in or near the vehicle. In some embodiments, one or more of the plurality of vehicles 104 may be configured to detect a proximity of the device 106 or another personally identifying device of the user and may identify the user based on the proximity of that device.

At step 204, a user profile matched with the identification of the user is obtained at step 202. The user profile may be stored in the server 102 and/or another storage location communicatively coupled to the network 110. In some embodiments, the user profile may include information about the user such as, for example, an identification of the user, carrier settings associated with a carrier plan of the user, a user location history, a carrier settings history, and other information about the user. The carrier settings of the user may include one or more SIM profiles of the user and may be used to update the data communication module to simulate the carrier settings of the user.

At step 206, the SIM data associated with the carrier plan of the obtained user profile is assigned to the data communication module to virtually replicate the SIM data of the user. In some embodiments, the data communication module may be a vehicle data communication module. Assigning the SIM data associated with the user's carrier plan to the data communication module may allow the data communication module to simulate the user's cell phone or other device that would connect to one or more of the various cellular and data services via the user's carrier plan. The user may then place and receive calls and transfer data using the vehicle to access the user's own carrier plan through the data communication module. In embodiments, the vehicle may be equipped with, for example, a hands-free system for placing calls and/or sending text messages or other digital communications.

At step 208, the carrier settings of the data communication module revert to the original settings based on the user no longer being identifiable. For example, the user may exit a vehicle and may no longer be identifiable by one or more biometric identifying devices of the vehicle or may no longer be visible by one or more cameras of the vehicle. In some embodiments, the user may exit a vehicle or may exit a predetermined radius of the vehicle and the device 106 of the user may no longer be detectable by the vehicle.

In some embodiments, the original settings of the data communication module may refer to the data communication module being set such that carrier settings associated with a carrier plan of the original equipment manufacturer are loaded to the data communication module. For example, if the original equipment manufacturer has a carrier plan with, for example, a 5G carrier, the data communication module may revert to settings such that the data communication module is capable of sending and receiving calls and data on a 5G network. In some embodiments, the data communication module is configured such that it can carry carrier settings of the original equipment manufacturer and one or more users simultaneously. In such embodiments, after the carrier settings of the original equipment manufacturer may remain configured to the data communication module throughout the association of the vehicle with the user. Accordingly, when the settings revert to the original settings, the original equipment manufacturer's carrier settings may simply remain configured on the data communication module.

At step 210, a second user may be identified. The second user may be identified (e.g., by a vehicle) similarly to the first user (referred to above as "user"). For example, one or more biometric identifiers (e.g., voice, finger print, etc.) or imaging devices may be used to capture user-specific data of the second user and the user-specific data may be compared to user-specific data associated with a user profile of the second user ("second user profile") that may be stored in the server 102 or a storage location accessible via the network 110.

At step 212, the second user profile matched with the identification of the second user is obtained. The second user profile includes SIM data associated with a second user carrier plan. In some embodiments, the second user profile may include information about the user such as, for example, an identification of the user, carrier settings associated with a carrier plan of the second user, a user location history of the second user, a carrier settings history, and other information about the second user. The carrier settings of the second user may include one or more SIM profiles of the user and may be used to update the data communication module to simulate the carrier settings of the second user.

In some embodiments, matching the user profile may include capturing an image of the user using one or more of an onboard camera and a device camera. For example, the user may enter the vehicle which may include one or more passenger-facing cameras (e.g., the imaging device 121). The one or more passenger-facing cameras may capture one or more images of the user and may send the corresponding image data to the server 102 via the network 110. In some embodiments, the device 106 may include a device camera (e.g., the imaging device 131) which may be used to match a user profile of the user to his or her carrier settings. For example, the user may enter the vehicle and may determine that he or she would like to receive and send calls and data using his or her own carrier plan through the vehicle. Accordingly, he or she may capture one or more images using a camera on the device 106 and may cause the images to be uploaded to the server 102 or other location connected to the network 110 where they may be used to match the user to his or her associated carrier plan details.

At step 214, the server 102 may cause the SIM data associated with the second user carrier plan of the obtained second user profile to be assigned to the data communication module to simultaneously virtually replicate the SIM data of the first user and the SIM data of the second user. Accordingly, in the case in which the SIM data associated with the first user and the second user are assigned to a vehicle, the vehicle may send and receive calls and data via the two virtually replicated SIMs of the user and the second user. The first and second virtually simulated SIM data may be configured to operate on different carrier networks. For example, the first SIM data may be configured to operate on AT&T and the second SIM data may be configured to operate on Verizon.

At step 216, the server 102 may configure the carrier settings of the data communication module such that the data communication module does not virtually replicate the SIM data of the first user based on the user no longer being identifiable. For example, if the first user exits the vehicle and is no longer detectable or identifiable by the vehicle, the server 102 may cause the data communication module to stop virtually replicating the SIM data of the user. Accordingly, the user's carrier plan may no longer be used to send and receive calls and data within the vehicle. In some embodiments, the data communication module may stop virtually replicating the SIM data of the user after a certain amount of time without a recognition of the user (e.g., using biometric data, image data, etc.) by the server 102. For example, if the user stops his or her utilization of one or more of the plurality of vehicles 104 and, for example, leaves the vehicle, he or she would no longer be recognized by a camera in the vehicle. The server 102 may receive a signal from the vehicle that the user is no longer recognized and may adjust the settings of the data communication module so that it no longer virtually replicates a SIM of the user and hence, the vehicle may no longer have access to the user's data and may no longer send and receive calls and/or data.

At step 218, the server 102 may configure the carrier settings of the data communication module such that the data communication module does not virtually replicate the SIM data of the second user based on the second user no longer being identifiable. For example, if the second user exits a vehicle and is no longer detectable by the vehicle, the server 102 may cause the data communication module to stop virtually replicating the SIM data of the second user. Accordingly, the second user's carrier plan may no longer be used to send and receive calls and data within the vehicle. For example, if the second user exits the vehicle and is no longer detectable by the vehicle, the server 102 may cause the data communication module to stop virtually replicating the SIM data of the second user. Accordingly, the second user's carrier plan may no longer be used to send and receive calls and data within the vehicle. In some embodiments, the data communication module may stop virtually replicating the SIM data of the second user after a certain amount of time without a recognition of the second user (e.g., using biometric data, image data, etc.) by the server 102. For example, if the second user stops his or her utilization of one or more of the plurality of vehicles 104 and, for example, leaves the vehicle, he or she would no longer be recognized by a camera in the vehicle. The server 102 may receive a signal from the vehicle that the second user is no longer recognized and may adjust the settings of the data communication module so that it no longer virtually replicates SIM data of the second user and hence, the vehicle may no longer have access to the user's data and may no longer send and receive calls and/or data.

In some embodiments, one or more users may be presented an option of whether he or she would like to virtually assign their carrier plan details to the data communication module of the vehicle. Such option may be presented to the user each time he or she comes into proximity of the vehicle's identifying sensors or may be presented to the user once or periodically. For example, a user may be asked to periodically provide permission to the vehicle to automatically set his or her carrier settings to the data communication module based on an identification of the user weekly, monthly, annually, etc. This may give the user options to, for example, control when his or her vehicle replicates the SIM of his or her device. This may assist with, for example, data overages and give the user more control over what is being sent and received using his or her carrier cellular/data plan and may generally improve the privacy protections of the user. The option may be presented to the user using, for example the interactive display 122 of the vehicle or the interactive display 126 of the device 106. Subsequently, the server 102 may receive a user selection indicating whether to set the carrier settings to replicate the SIM data of the user or not. If the user indicates he or she would like the data communication module to virtually replicate his or her SIM data, the server 102 may cause the data communication module to replicate the carrier settings of the user. If the user does not make a choice or chooses not to replicate his or her carrier settings, the vehicle does not replicate the SIM data of the user.

Figure 3:
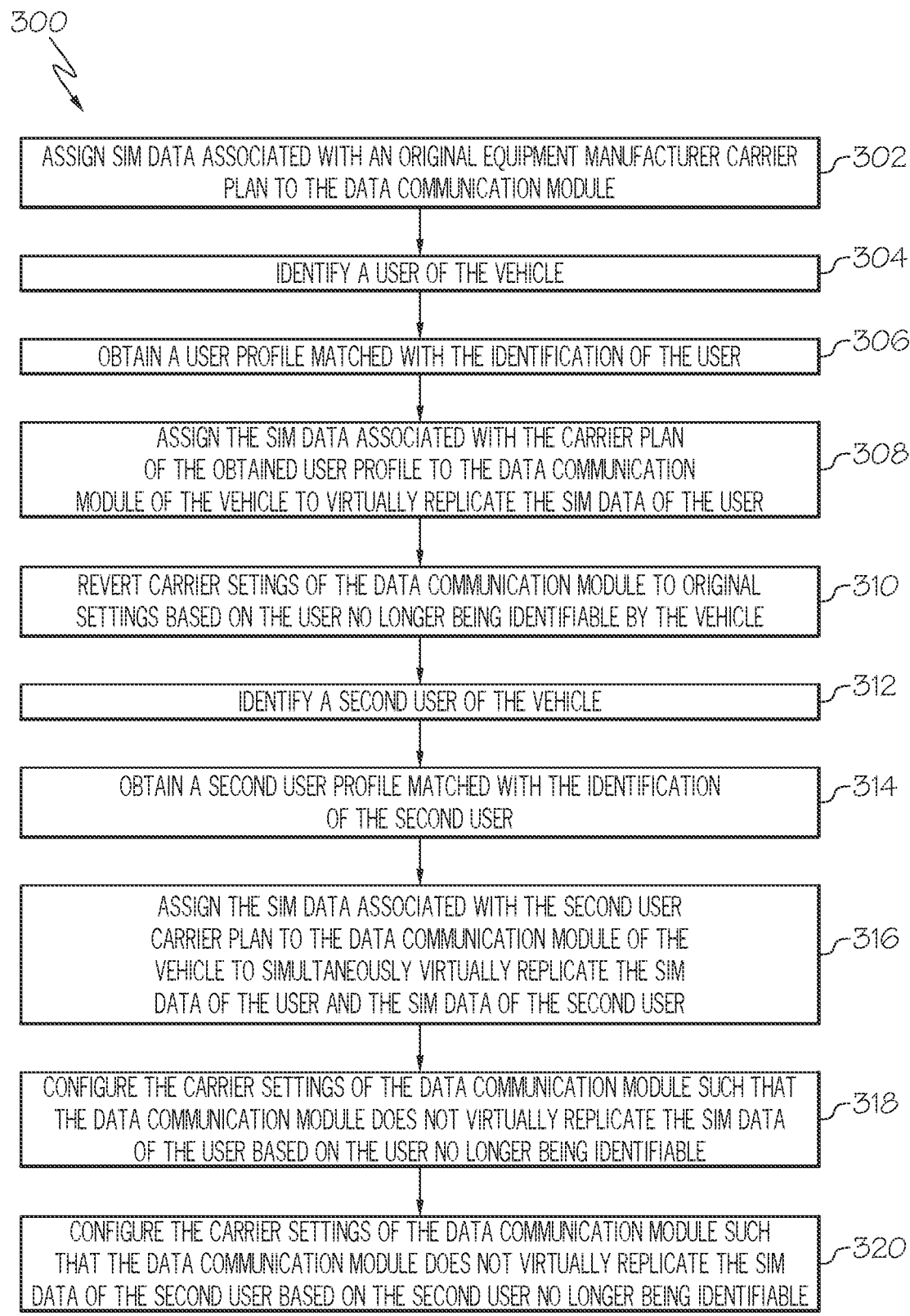
FIG. 3 depicts a method for virtually replicating a SIM of a user, according to one or more embodiments shown and described herein.

Referring now to FIGS. 1 and 3, a method 300 of setting a user's carrier settings to the data communication module of any of the plurality of vehicles 104 is shown. At step 302, the controller 119 of the vehicle or the server 102 may assign SIM data associated with an original equipment manufacturer carrier plan to the data communication module. An original equipment manufacturer may, for example, have a preferred carrier with which the original equipment manufacturer contracts to provide cellular phone and data capability to one or more vehicles, for example, a fleet of vehicles. The cellular phone and data capability provided to the original equipment manufacturer may be used to send, for example, diagnostic data, use data, and other information about a vehicle (e.g., vehicle systems status updates, systems configurations, user data, odometer readings, location updates, etc.). The original equipment manufacturer have one or more databases communicatively coupled with the vehicle via the network 110 to store and may analyze such data, for example, to predict maintenance patterns, usage patterns, etc.

Further, the data communication module may be configurable to virtually replicate more than one SIM data at a time and at step 304, the controller 119 of the vehicle 104 may identify a user of the vehicle in order to replicate that particular user's SIM data. The controller 119 of the vehicle may identify the user, for example, using the user identification module 120 of the vehicle or the user identification module 130 of the device 106. In some embodiments, the user may be identified using one or more biometric identifiers. For example, a user may be identified using fingerprint or voice recognition. The device 106 and/or the vehicle may be configured with a fingerprint reader and/or the vehicle may use an onboard sound system including speakers and one or more microphones to record and identify a user's voice. The recorded biometric data may be compared to biometric data in a database. In some embodiments, the system 100 may capture one or more images of the user and may send the image data to the server 102 to compare the captured image data with image data in a database. In other embodiments, the user may be identified based on the identification of the device 106. For example, the controller 119 of the vehicle 104 may receive location data from the device 106 and may use such data to determine that the user is in or near the vehicle. In some embodiments, one or more of the plurality of vehicles 104 may be configured to detect a proximity of the device 106 or another personally identifying device of the user and may identify the user based on the proximity of that device.

At step 306, the controller 119 of the vehicle 104 may obtain a user profile matched with the identification of the user, wherein the user profile includes SIM data associated with a carrier plan of the user. In embodiments, the controller 119 of the vehicle 104 may obtain the user profile from the server 102. The user profile may be stored in the server 102 and/or another storage location communicatively coupled to the network 110 (e.g., the device 106). In some embodiments, the user profile may include information about the user such as, for example, carrier settings associated with a carrier plan of the user, a user location history, a carrier settings history, and other information about the user. The carrier settings of the user may include one or more SIM profiles of the user and may be used to update the data communication module to simulate the carrier settings of the user.

At step 308, the controller 119 of the vehicle 104 or the server 102 may assign the SIM data associated with the carrier plan to the data communication module of the vehicle to virtually replicate a SIM of the user based on the matched user profile. Assigning the SIM data associated with the user's carrier plan to the data communication module may allow the data communication module to simulate the user's cell phone or other device that would connect to one or more of the various cellular and data services via the user's carrier plan. The user may then place and receive calls and transfer data using the vehicle to access the user's own carrier plan through the data communication module. In embodiments, the vehicle may be equipped with, for example, a hands-free system for placing calls and/or sending text messages or other digital communications.

At step 310, the controller 119 of the vehicle 104 may revert carrier settings of the data communication module to original settings based on the user no longer being identifiable by the vehicle. For example, the user may exit the vehicle and may no longer be identifiable by the one or more biometric identifying devices or may no longer be visible by one or more cameras of the vehicle. In some embodiments, the user may exit the vehicle or may exit a predetermined radius of the vehicle and the device 106 of the user may no longer be detectable by the vehicle.

At step 312, the controller 119 of the vehicle 104 may identify a second user of the vehicle. The second user may be identified similarly to the first user (referred to above as "user"). For example, one or more biometric identifiers (e.g., voice, finger print, etc.) or imaging devices may be used to capture user-specific data of the second user and the user-specific data may be compared to user-specific data associated with a user profile of the second user ("second user profile") that may be stored in the server 102 or a storage location accessible via the network 110.

The second user profile may be matched with the second user based on the second identification. The second user profile includes SIM data associated with a second user carrier plan. In some embodiments, the second user profile may include information about the user such as, for example, carrier settings associated with a carrier plan of the second user, a user location history of the second user, a carrier settings history, and other information about the second user. The carrier settings of the second user may include one or more SIM profiles of the user and may be used to update the data communication module to simulate the carrier settings of the second user.

In some embodiments, matching the user profile may include capturing an image of the user using one or more of an onboard camera and a device camera. For example, the user may enter the vehicle which may include one or more passenger-facing cameras (e.g., the imaging device 121). The one or more passenger-facing cameras may capture one or more images of the user and may send the corresponding image data to the server 102 via the network 110. In some embodiments, the device 106 may include a device camera (e.g., the imaging device 131) which may be used to match a user profile of the user to his or her carrier settings. For example, the user may enter the vehicle and may determine that he or she would like to receive and send calls and data using his or her own carrier plan through the vehicle. Accordingly, he or she may capture one or more images using a camera on the device 106 and may cause the images to be uploaded to the server 102 or other location connected to the network 110 where they may be used to match the user to his or her associated carrier plan details.

At step 316, the controller 119 of the vehicle 104 or the server 102 may assign the SIM data associated with the second user carrier plan to the data communication module of the vehicle to simultaneously virtually replicate the SIM data of the user and the SIM data of the second user based on the matched user profile and the matched second user profile, respectively. Accordingly, the vehicle may send and receive calls and data via the two virtually replicated SIM data of the user and the second user. The first and second virtually simulated SIM data may be configured to operate on different carrier networks. For example, the first SIM data may be configured to operate on AT&T and the second SIM data may be configured to operate on Verizon.

At step 318 the controller 119 of the vehicle 104 or the server 102 may configure the carrier settings of the data communication module such that the data communication module does not virtually replicate the SIM data of the first user based on the user no longer being identifiable. For example, if the first user exits the vehicle and is no longer detectable or identifiable by the vehicle, the controller 119 of the vehicle 104 or the server 102 may cause the data communication module to stop virtually replicating the SIM data of the user. Accordingly, the user's carrier plan may no longer be used to send and receive calls and data within the vehicle. In some embodiments, the data communication module may stop virtually replicating the SIM data of the user after a certain amount of time without a recognition of the user (e.g., using biometric data, image data, etc.) by the controller 119 of the vehicle 104 or the server 102. For example, if the user stops his or her utilization of one or more of the plurality of vehicles 104 and, for example, leaves the vehicle, he or she would no longer be recognized by a camera in the vehicle. The server 102 may receive a signal from the vehicle that the user is no longer recognized and may adjust the settings of the data communication module so that it no longer virtually replicates SIM data of the user and hence, the vehicle may no longer have access to the user's data and may no longer send and receive calls and/or data.

At step 320 the controller 119 of the vehicle 104 or the server 102 may configure the carrier settings of the data communication module such that the data communication module does not virtually replicate the SIM of the second user based on the second user no longer being identifiable. For example, if the second user exits the vehicle and is no longer detectable by the vehicle, the controller 119 of the vehicle 104 or the server 102 may cause the data communication module to stop virtually replicating the SIM of the second user. Accordingly, the second user's carrier plan may no longer be used to send and receive calls and data within the vehicle. For example, if the second user exits the vehicle and is no longer detectable by the vehicle, the controller 119 of the vehicle 104 or the server 102 may cause the data communication module to stop virtually replicating the SIM of the second user. Accordingly, the second user's carrier plan may no longer be used to send and receive calls and data within the vehicle. In some embodiments, the data communication module may stop virtually replicating the SIM data of the second user after a certain amount of time without a recognition of the second user (e.g., using biometric data, image data, etc.) by the server 102. For example, if the second user stops his or her utilization of one or more of the plurality of vehicles 104 and, for example, leaves the vehicle, he or she would no longer be recognized by a camera in the vehicle. The controller 119 of the vehicle 104 or the server 102 may receive a signal from the vehicle that the second user is no longer recognized and may adjust the settings of the data communication module so that it no longer virtually replicates SIM data of the second user and hence, the vehicle may no longer have access to the user's data and may no longer send and receive calls and/or data.

Figure 4:
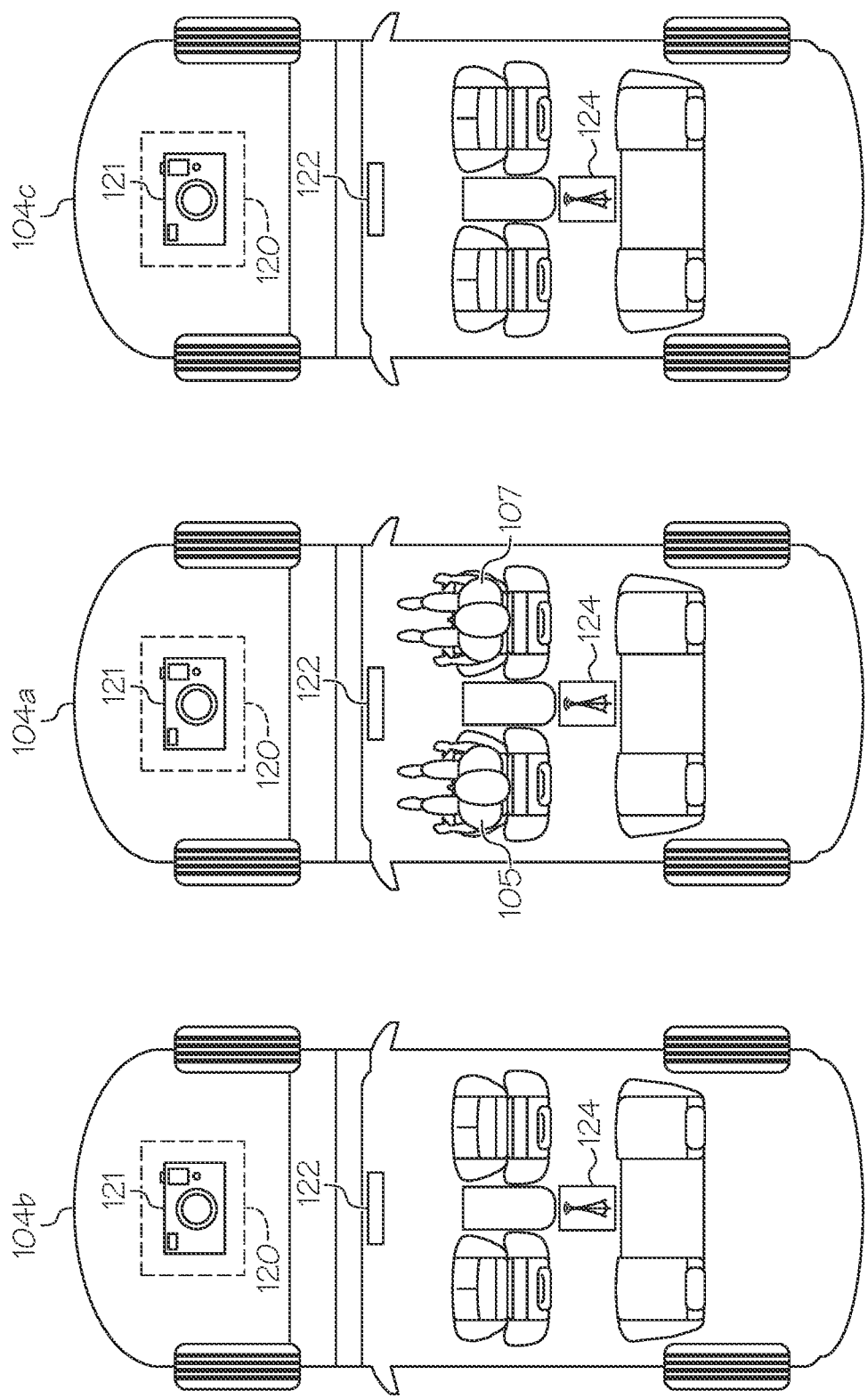
FIG. 4 depicts a scenario for using the system of FIG. 1 to virtually replicate a SIM of a user, according to one or more embodiments shown and described herein.

Referring now to FIGS. 1 and 4, an exemplary scenario for using a system 100 for identifying one or more users and assigning the carrier plan details of the one or more users to a data communication module of a vehicle is shown. FIG. 4 shows three vehicles: a first vehicle 104a, a second vehicle 104b, and a third vehicle 104c. The first vehicle 104a, the second vehicle 104b, and the third vehicle 104c may be substantially similar and may be vehicles available for share in a car-sharing service or car rental service. Each vehicle may include the network interface hardware 124 (which may be configurable as or may include a data communication module), the user identification module 120 (which includes the imaging device 121), and the interactive display 122. Each of the first vehicle 104a, the second vehicle 104b, and the third vehicle 104c may have a data communication module that includes SIM data of an original equipment manufacturer. This SIM data may be in the form of an actual SIM card or may be virtually replicated based on SIM data stored, for example, in the server 102 and/or locally in a storage location on the vehicle. The original equipment manufacturer SIM data may allow the vehicles to connect to the network 110 using the cellular plan of the original equipment manufacturer so that the vehicles can send data related to vehicle use (e.g., diagnostic and other data as discussed herein).

FIG. 4 shows a first user 105 and a second user 107 in the first vehicle 104a. Referring to FIGS. 1 and 4, the server 102 may identify the first user 105 and the second user 107 using one or more onboard systems (e.g., one or more user identification devices). For example, the first user 105 and the second user 107 may be identified using the imaging device 121. The imaging device 121 may be a camera installed in a rear view mirror 109 of the first vehicle 104a, for example. In some embodiments, the first vehicle 104a may include other user identification devices for identifying one or more users, such as, for example, a voice recognition system, a fingerprint identification system, one or more device detection systems that is configured to detect a device of the user (e.g., the device 106), etc. The identification device, in this case the imaging device 121, is used to capture identifying data about the one or more users and provides such identifying data to the server 102 (e.g., via the network 110). In some embodiments, a device of the user may be used to identify the user. For example, the imaging device 131 of the user identification module 130 of the device 106 may be used to capture an image of the user and this image data may be used to identify the user.

The server 102 may receive the identification data of the user from the vehicle and retrieve a user profile matched with the user (e.g., using the user profile identification module 112) and may identify carrier settings or a carrier plan associated with the user. The carrier settings may be associated with a cellular voice and/or data plan and associated with a SIM of the user. That is, the personal cellular voice and/or data plan of the user.

This SIM data may be virtually replicated using the data communication module of the first vehicle 104a. The virtual replication of the user's SIM data may not affect the SIM data of the original equipment manufacturer, which may also be used to send and receive calls and data. Accordingly, both the user and the original equipment manufacturer may simultaneously send and receive cellular phone and data via the data communication module. Likewise, the second user may be identified by the controller of the first vehicle 104a using one or more identification devices and the SIM data associated with his or her carrier plan may be virtually replicated on the data communication module such that the original equipment manufacturer, the first user, and the second user can each send and receive calls and data using the data communication module. Accordingly, neither the first user nor the second user needs to pair his or her cellular device with the phone using, for example, a Bluetooth pairing. The system simply recognizes the first user and the second user and assigns their SIM virtually to the data communication module.

In some embodiments, the controller of the first vehicle 104a may require an affirmative response from the user before replicating the user's SIM data using the data communication module. For example, the controller of the first vehicle 104a may cause an acknowledgment or other information to be provided to the first user 105 and the second user 107 and may require receipt of information from the first user 105 and/or the second user 107 before assigning his or her carrier details to the data communication module. The request for information may be presented to the users, for example, using the interactive display 122. For example, the question: "Would you like to assign your SIM data to the data communication module to send and receive cellular calls and data using the vehicle? Yes or No." The controller of the first vehicle 104a may virtually replicate the SIM of the users based on the response.

It should now be understood that users of a car-sharing or car rental service may be identified by a vehicle and their own carrier plan may be used to send and receive cellular calls and data by virtually replicating SIM data of the user using the data communication module of the vehicle. Accordingly, users need not hassle with pairing a phone via a Bluetooth or other connection with the vehicle and need not even have their phone with them in the vehicle. Further, such virtual replication may be optional to the user, allowing him or her to protect his or her privacy if so desired. Accordingly, the use of car-sharing and car rental services may proliferate upon the implementation of such a system and such systems are required.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
   identifying a user using one or more of biometrics, voice recognition, and image recognition;
   transmitting an identification of the user to a server;
   obtaining a user profile for the user from the server, the user profile being associated with the identification of the user, wherein the user profile includes subscriber identification module (SIM) data associated with a carrier plan;
   assigning the SIM data associated with the carrier plan of the obtained user profile to a data communication module to virtually replicate the SIM data of the user; and
   reverting carrier settings of the data communication module to original settings based on the user no longer being identifiable.

2. The method of claim 1, wherein the data communication module is a vehicle data communication module.

3. The method of claim 1, wherein when the original settings are applied to the data communication module, SIM data associated with an original equipment manufacturer is uploaded to the data communication module.

4. The method of claim 3, wherein the SIM data associated with the original equipment manufacturer is assigned to the data communication module to virtually replicate the SIM data of the original equipment manufacturer.

5. The method of claim 1, wherein the SIM data associated with the carrier plan of the obtained user profile and SIM data associated with an original equipment manufacturer are simultaneously assigned to the data communication module.

6. The method of claim 1, further comprising:
   identifying a second user;
   obtaining a second user profile matched with an identification of the second user, wherein the second user profile includes SIM data associated with a second user carrier plan;
   assigning the SIM data associated with the second user carrier plan of the obtained second user profile to the data communication module to simultaneously virtually replicate the SIM data of the user and the SIM data of the second user;

configuring the carrier settings of the data communication module such that the data communication module does not virtually replicate the SIM data of the user based on the user no longer being identifiable; and configuring the carrier settings of the data communication module such that the data communication module does not virtually replicate the SIM data of the second user based on the second user no longer being identifiable.

7. The method of claim 1, wherein identifying the user comprises:
capturing an image of the user using one or more of an onboard camera and a device camera; and
comparing the image of the user to one or more images stored in a database.

8. The method of claim 1, further comprising:
presenting an option of setting carrier settings of the data communication module to replicate the SIM data of the user based on the carrier plan associated with the obtained user profile;
receiving a user selection that indicates whether to set the carrier settings to replicate the SIM data of the user or not; and
setting the carrier settings to replicate the SIM data of the user based on the received user selection.

9. The method of claim 8, wherein the option of setting carrier settings is presented to the user using a display of a portable device of the user.

10. A system comprising:
a data communication module and
a controller, the controller configured to:
identify a user of a vehicle using one or more of biometrics, voice recognition, and image recognition;
transmit an identification of the user to a server;
obtain a user profile for the user from the server, the user profile being associated with the identification of the user, wherein the user profile includes subscriber identification module (SIM) data associated with a carrier plan;
assign the SIM data associated with the carrier plan of the obtained user profile to the data communication module of the vehicle to virtually replicate the SIM data of the user; and
revert carrier settings of the data communication module to original settings based on the user no longer being identifiable by the vehicle.

11. The system of claim 10, wherein when the original settings are applied to the data communication module, SIM data associated with an original equipment manufacturer is uploaded to the data communication module.

12. The system of claim 11, wherein the SIM data associated with the original equipment manufacturer is assigned to the data communication module to virtually replicate the SIM data of the original equipment manufacturer.

13. The system of claim 10, wherein SIM data associated with the carrier plan of the obtained user profile and SIM data associated with an original equipment manufacturer are simultaneously assigned to the data communication module.

14. The system of claim 10, wherein the controller is further configured to:
identify a second user of the vehicle;
obtain a second user profile matched with an identification of the second user, wherein the second user profile includes SIM data associated with a second user carrier plan;
assign the SIM data associated with the second user carrier plan of the obtained second user profile to the data communication module of the vehicle to simultaneously virtually replicate the SIM data of the user and the SIM data of the second user;
configure the carrier settings of the data communication module such that the data communication module does not virtually replicate the SIM data of the user based on the user no longer being identifiable; and
configure the carrier settings of the data communication module such that the data communication module does not virtually replicate the SIM data of the second user based on the second user no longer being identifiable.

15. A vehicle comprising:
a data communication module and
a controller, the controller configured to:
assign SIM data associated with an original equipment manufacturer carrier plan to the data communication module;
identify a user of the vehicle using one or more of biometrics, voice recognition, and image recognition;
transmit an identification of the user to a server;
obtain a user profile for the user from the server, the user profile being associated with the identification of the user, wherein the user profile includes subscriber identification module (SIM) data associated with a carrier plan;
assign the SIM data associated with the carrier plan of the obtained user profile to the data communication module of the vehicle to virtually replicate the SIM data of the user; and
revert carrier settings of the data communication module based on the user no longer being identifiable by the vehicle.

16. The vehicle of claim 15, wherein the controller is further configured to:
identify a second user of the vehicle;
obtain a second user profile matched with an identification of the second user, wherein the second user profile includes SIM data associated with a second user carrier plan; and
assign the SIM data associated with the second user carrier plan to the data communication module of the vehicle to simultaneously virtually replicate the SIM data of the user and the SIM data of the second user.

17. The vehicle of claim 16, the controller further configured to:
configure the carrier settings of the data communication module such that the data communication module does not virtually replicate the SIM data of the user based on the user no longer being identifiable; and
configure the carrier settings of the data communication module such that the data communication module does not virtually replicate the SIM data of the second user based on the second user no longer being identifiable.

* * * * *

UNITED STATES PATENT AND TRADEMARK OFFICE
CERTIFICATE OF CORRECTION

PATENT NO. : 11,702,082 B2  
APPLICATION NO. : 16/952660  
DATED : July 18, 2023  
INVENTOR(S) : Evan A. Vijithakumara Page 1 of 1

It is certified that error appears in the above-identified patent and that said Letters Patent is hereby corrected as shown below:

In the Drawings

In drawing sheet 2 of 4, figure 2, and on the title page, the illustrative print figure, delete "SETINGS" of "[REVERT CARRIER SETINGS OF THE DATA COMMUNICATION MODULE TO ORIGINAL SETTINGS BASED ON THE USER NO LONGER BEING IDENTIFIABLE — 208]" and insert --SETTINGS--, therefor.

In drawing sheet 3 of 4, figure 3, delete "SETINGS" of "[REVERT CARRIER SETINGS OF THE DATA COMMUNICATION MODULE TO ORIGINAL SETTINGS BASED ON THE USER NO LONGER BEING IDENTIFIABLE BY THE VEHICLE — 310]" and insert --SETTINGS--, therefor.

In the Specification

In Column 2, Line(s) 49, after "required", insert --.--.

Signed and Sealed this  
Twenty-ninth Day of August, 2023

*Katherine Kelly Vidal*

Katherine Kelly Vidal  
*Director of the United States Patent and Trademark Office*